United States Patent
Hörnfeldt

(10) Patent No.: US 6,175,294 B1
(45) Date of Patent: Jan. 16, 2001

(54) TRANSFORMER WITH SUPERCONDUCTING WINDINGS

(75) Inventor: Sven Hörnfeldt, Västerås (SE)

(73) Assignee: Asea Brown Boveri AB (SE)

( * ) Notice: Under 35 U.S.C. 154(b), the term of this patent shall be extended for 0 days.

(21) Appl. No.: 09/077,544

(22) PCT Filed: Dec. 10, 1996

(86) PCT No.: PCT/SE96/01625
§ 371 Date: Jun. 1, 1998
§ 102(e) Date: Jun. 1, 1998

(87) PCT Pub. No.: WO97/24736
PCT Pub. Date: Jul. 10, 1997

(30) Foreign Application Priority Data

Dec. 27, 1995 (SE) .................................... 9504650

(51) Int. Cl.⁷ .................................................. H01F 27/36
(52) U.S. Cl. .................. 336/84 R; 336/84 C; 336/84 M
(58) Field of Search ............................. 336/84 R, 84 C, 336/84 M; 335/216

(56) References Cited

U.S. PATENT DOCUMENTS

| 4,012,706 | 3/1977 | Westendorp ........................... 336/84 |
| 4,021,764 | * 5/1977 | Winn .................................... 336/223 |
| 4,135,173 | * 1/1979 | Philp .................................... 336/232 |
| 4,356,468 | * 10/1982 | VanLaar ............................. 336/84 R |
| 5,689,223 | * 11/1997 | Demarmels et al. ................ 335/216 |

FOREIGN PATENT DOCUMENTS

| 516 078 A2 | * 12/1992 | (EP) .................................. 336/84 R |
| 63-73511 | * 4/1988 | (JP) .................................. 336/84 R |

* cited by examiner

Primary Examiner—Anh Mai
(74) Attorney, Agent, or Firm—Dykema Gossett PLLC

(57) ABSTRACT

The present invention relates to a transformer with superconducting primary and secondary windings (1, 2), concentrically wound around a core limb (3), between which windings there is a concentric tubular space, the main channel, with insulation material (10) for insulation between the two windings. Cylindrical screens (11, 12) of a magnetic material with a high relative permeability are concentrically introduced into the insulation material at the two ends of the main channel.

13 Claims, 2 Drawing Sheets

TRANSFORMER WITH SUPERCONDUCTING WINDINGS

TECHNICAL FIELD

One important condition for transformers to be provided with superconducting windings while at the same time becoming a competitive product in relation to transformers with conventional windings is that the alternating-current (ac) losses are minimized. Because the currently available high-temperature superconducting materials are designed as a tape, superconducting windings will resemble conventional sheet-wound windings. Since the ac losses in the superconducting tape are to a great extent dependent on the direction of an alternating magnetic field relative to the plane of the tape, special measures must be taken to be able to maintain the ac losses at an acceptable level. The present invention relates to a design which contributes to minimize these losses.

BACKGROUND ART, PROBLEMS

Characteristic of superconductors is that the possible current density is considerably higher than for ordinary conductors. As mentioned above, a superconductor which is to be used in a transformer winding usually has the shape of a tape. The currently available tape contains about 30% superconductor and 70% silver matrix. The superconducting material has such an orientation in the tape that the ac losses are 3–5 times greater if the alternating magnetic field to which the conductor is subjected is directed perpendicular to the plane of the tape than if the field lies in the plane of the tape.

Figure 1:
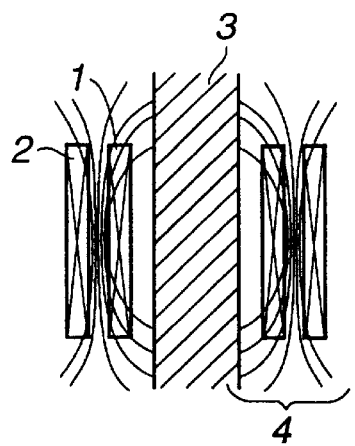
FIG. 1 schematically shows the magnetic field configuration of two concentric transformer windings around a limb of a transformer core.

If no special measures are taken for a transformer, the magnetic field configuration for two concentric windings 1 and 2 around a limb 3 of the transformer core will have the appearance shown in FIG. 1. The substantially axial magnetic leakage flux 4 extending between the windings deflects into a more or less radial direction at the two ends of the windings. This causes the windings to become traversed by a magnetic flux with a radial component which generates eddy currents in the conductor and causes losses. This is, of course, true irrespectively of whether the winding consists of a conventional sheet winding or if it is designed as a superconducting sheet (tape) winding. Because of the loss properties of the superconducting tape depending on the direction of the field relative to the plane of the tape, this problem will become still more accentuated in superconducting windings than in conventional windings.

Figure 2:
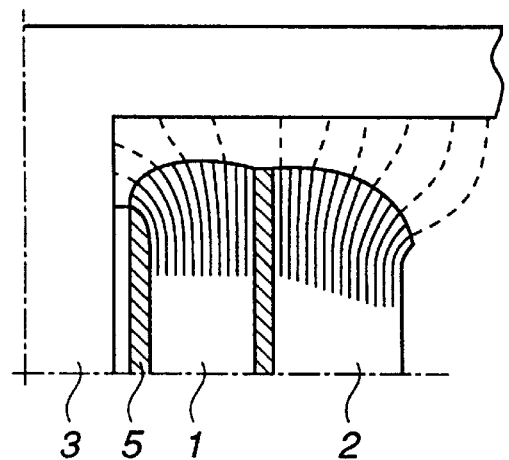
FIG. 2 shows how, according to the state of the art, conventional sheet-wound transformer windings are designed to keep the losses as low as possible.

A typical example of the technique used in conventional sheet windings to reduce the losses arising because of the radial field component is disclosed in U.S. Pat. No. 4,323,870. Instead of attempting to influence the field configuration, the conductor material is allowed to follow the field. This is done in such a way that the tape is formed such that the magnetic field vector at each point is tangent to the conductor surface. In this way, the eddy currents can be eliminated. The accompanying FIG. 2, which is identical with FIG. 1 in the above US patent, shows how sheet-wound windings can be designed to achieve this desired effect. The inward rounding towards the core limb is brought about by rounding off the winding support body 5, which is really not necessary from a mechanical point of view, at the ends towards the core limb, and the outward rounding can be performed with the aid of wedges or linings of different kinds. This method, however, entails an increased space requirement, increased radius of the windings resulting in increased losses, and a relatively time-consuming and difficult winding work.

Figure 3:
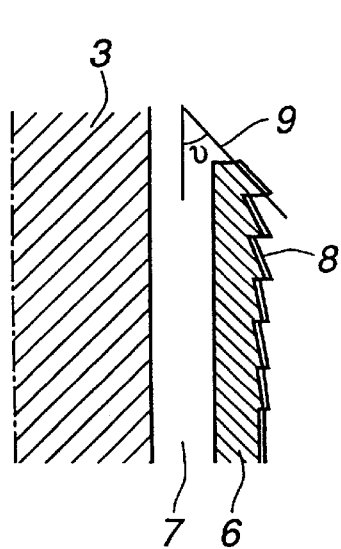
FIG. 3 shows how to proceed, according to the state of the art, to obtain low losses when using superconducting windings.

An example of how to proceed to keep the losses low when superconducting windings are used is clear from SE 92024553, "winding support body for transformers/reactors with superconductors" and the accompanying FIG. 3. The superconducting tape 8 is wound onto a winding support body 6 consisting of a substantially straight, circular-cylindrical, tubular support body. Between the core limb 3 and the winding support body there is a so-called cryogenic wall 7. On that side where the winding is to be placed, the support body is provided outwards towards the two ends with a helical slot along the support body, the slot having a plane surface with a width equal to the width of the conductor. In this way, each turn of the slot around the support body outwards towards the ends forms a surface which practically constitutes the envelope surface of a straight frustum of a cone. The angle between a generatrix 9 of the envelope surface of the straight frustum of a cone and the axial centre line of the support body increases for each turn outwards towards the ends of the support body such that the envelope surface, at all points, coincides with the direction of the magnetic field. The mid-portion of the support body has a circular-cylindrical envelope surface without slots. Because of the helical slot along the ends of the support body, the superconducting tape can be wound continuously in one or more layers along the entire support body.

SUMMARY OF THE INVENTION, ADVANTAGES

According to the invention, a different approach is used for preventing the occurrence of eddy currents in the tape at the ends of the windings and ac losses associated therewith. Instead, the magnetic field is influenced such that, in the axial length of the whole windings, the magnetic field extends in parallel with the symmetry axis of the windings, that is, it does not, as in FIG. 1, deflect at the ends of the windings.

Between the concentrically disposed secondary and primary windings of the transformer, there is a concentric tubular space, that so-called main channel, filled with insulating material for electrical insulation between the two windings. To control the field so as to extend in parallel with the symmetry axis of the windings also at the ends of the windings, a number of concentric cylindrical screens of magnetic material with a high relative permeability, suitably greater than $10^3$, are introduced together with and in the insulation in the two ends of the main channel. If the screens are of a non-electrically conducting material, they may form closed turns around the core limb, since a magnetic flux in the core limb cannot induce an electrical current in such a material. If the screens are made of an electrically conducting material, the screens cannot be allowed to form closed turns around the core limb since this would result in cirulating induced currents and associated losses. Thus, if the screens are made of an electrically conducting material, the screens are to be slotted or, in case of overlapping, have a satisfactory insulation at the overlap. In this way, the current path of the induced current is broken.

Figure 4:
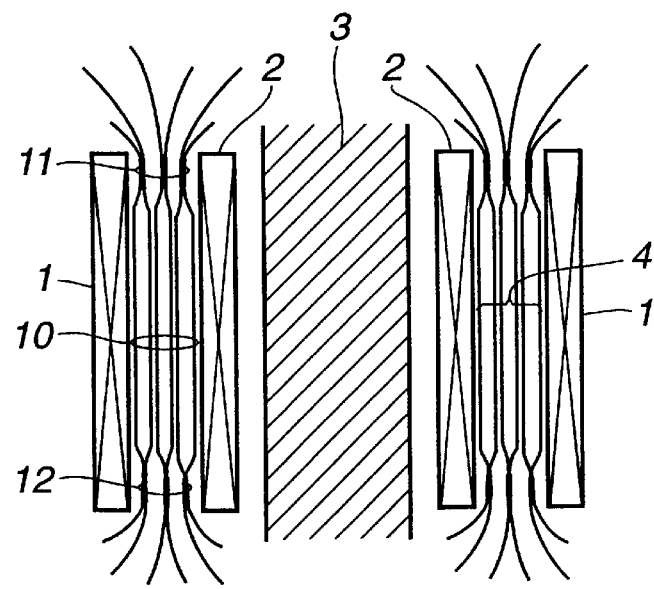
FIG. 4 shows a design according to the invention to obtain low losses.

One embodiment of the invention is clear from FIG. 4. The concentric windings are shown in FIG. 1 at 1 and 2 and the transformer limb is shown at 3. The magnetic field lines 4 are indicated in the main channel 10 which is filled with insulation material. In the upper and lower parts of the main channel, a number of cylindrical screens 11 and 12 of a magnetic material according to the above are concentrically introduced. As is clear from the figure, the object of these screens is to concentrate the flux lines such that, also at the upper and lower parts of the windings, they extend in the main channel and do not more or less radially penetrate through the windings.

Figure 5:
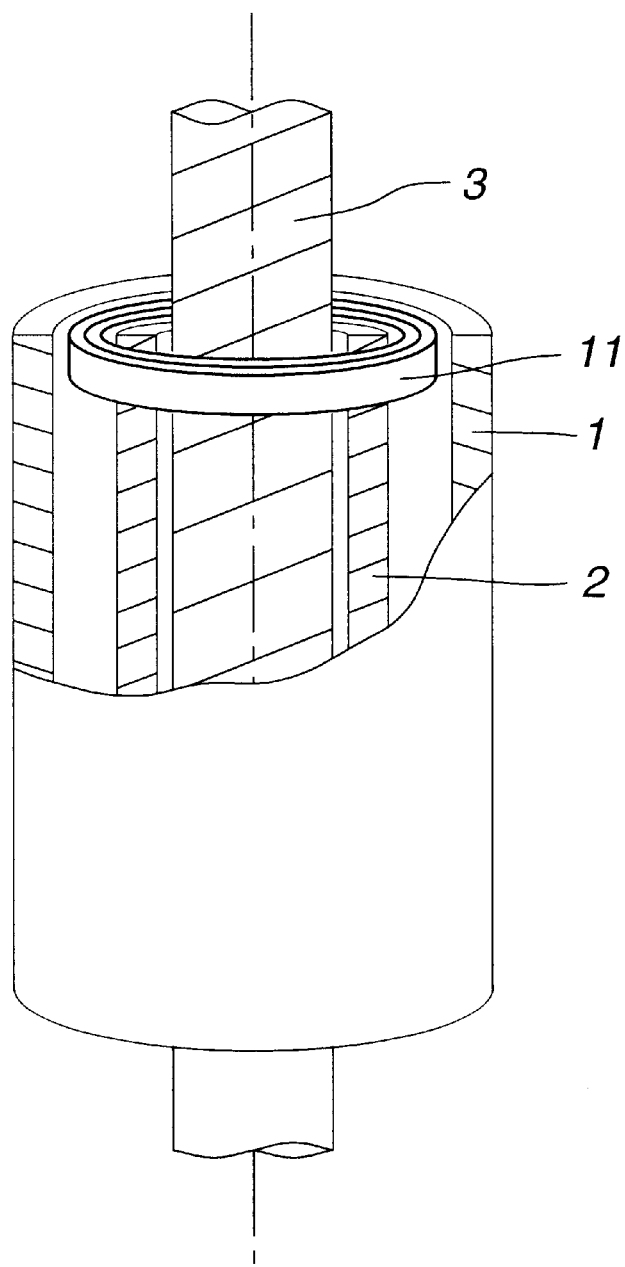
FIG. 5 shows the design illustrated in FIG. 4 in a perspective view.

FIG. 5 shows the design previously shown in FIG. 4 in a prospective. The windings and the core limb are shown in a cut away view in order to simply the understanding of the geometry of the screen rings. In the figure, only the cylindrical screens 11 in the upper part of the main channel are visible, In this embodiment, the screens form closed turns around the core limb.

Figure 6:
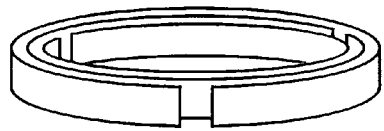
FIG. 6 shows three slotted concentric cylindrical screen rings.
Figure 7:
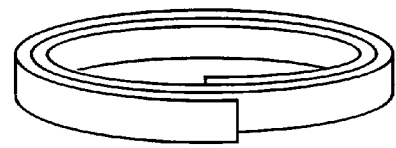
FIG. 7 shows a helical ring forming a spiral screen with an overlapping geometry.

The scope of the invention allows for the number of screen rings to be different depending on the current space in the main channel, the thickness and the magnetic properties, in other respects, of the screen material. However, the screen rings must be dimensioned such that, at rated current, they do not become magnetically saturated. At the same time, there must be sufficient space for the necessary insulation between the windings. Otherwise, the axial length of the screens should be adapted to the current transformer design. A suitable material for these screens is so-called amorphous transformer sheet or other material with negligible hysteresis losses. In FIG. 6, an alternative embodiment of the screens are shown where the screens 11A are slotted. Such an embodiment is preferred if the screens are made of an electrically conductive material.

In one embodiment the concentric rings may be replaced by a helical ring forming a spiral screen 11B having an overlapping geometry. In the case of the screen being made from an electrically conducting material, the screen should have satisfactory insulation in a radial direction between successive turns of the screen.

What is claimed is:

1. A transformer with superconducting primary and secondary windings concentrically wound around a core limb, between which windings there is a concentric tubular main channel, with insulation material for insulation between the two windings, wherein cylindrical screens of a magnetic material with a high relative permeability are concentrically introduced into the insulation material at the two ends of the main channel.

2. A transformer with superconducting primary and secondary windings according to claim 1, wherein the screens are made from a non-electrically conducting material and form closed turns around the core limb.

3. A transformer with superconducting primary and secondary windings according to claim 1, wherein the screens are made from electrically conducting material and have slots breaking the induced current path around the core limb.

4. A transformer with superconducting primary and secondary winding according to claim 1 wherein the screens are located only at the ends of the main channel.

5. A transformer with superconducting primary and secondary windings according to claim 1, wherein the screens are made from amorphous transformer sheet.

6. A transformer with superconducting primary and secondary windings concentrically wound around a core limb, between which windings there is a concentric tubular space, the main channel, filled with insulation material for insulation between the two windings, wherein a cylindrical, spiral screen of a magnetic material with a high relative permeability is concentrically introduced into the insulation material at the two ends of the main channel.

7. A transformer with superconducting primary and secondary windings according to claim 6, wherein the spiral screen is made from amorphous transformer sheet.

8. A transformer comprising:
   a core limb:
   superconducting primary and secondary windings concentrically wound around the core limb said windings being wound with a concentric tubular space therebetween forming a main channel having ends;
   insulation material disposed in the space for insulating the windings; and
   cylindrical screens of magnetic material having a high relative permeability located in the channel at the ends.

9. The transformer according to claim 8, wherein the screens comprise slotted electrically conducting material.

10. The transformer according to claim 8, wherein the screens form closed turns of a non-electrically conducting material.

11. The transformer according to claim 8, wherein the magnetic material comprises a cylindrical, spiral screen.

12. The transformer according to claim 11, wherein the screen comprises a spiral amorphous transformer sheet.

13. The transformer according to claim 8, wherein the screens comprise an amorphous transformer sheet.

* * * * *